US008656387B2

(12) United States Patent  
Smith et al.

(10) Patent No.: US 8,656,387 B2  
(45) Date of Patent: Feb. 18, 2014

(54) METHOD AND SYSTEM FOR WORKLOAD DISTRIBUTING AND PROCESSING ACROSS A NETWORK OF REPLICATED VIRTUAL MACHINES

(75) Inventors: Timothy Smith, Toronto (CA); Adin Scannell, Toronto (CA); Horacio Andres Lagar Cavilla, Norris Plains, NJ (US)

(73) Assignee: Gridcentric Inc., Toronto (CA)

( * ) Notice: Subject to any disclaimer, the term of this patent is extended or adjusted under 35 U.S.C. 154(b) by 762 days.

(21) Appl. No.: 12/817,319

(22) Filed: Jun. 17, 2010

(65) Prior Publication Data

US 2011/0314465 A1    Dec. 22, 2011

(51) Int. Cl.
  *G06F 9/455*   (2006.01)
  *G06F 9/46*    (2006.01)
(52) U.S. Cl.
  USPC ............................................................ 718/1
(58) Field of Classification Search
  None
  See application file for complete search history.

(56) References Cited

U.S. PATENT DOCUMENTS

| | | |
|---|---|---|
| 7,167,894 B1 | 1/2007 | Boudnik et al. |
| 7,577,959 B2 | 8/2009 | Nguyen et al. |
| 7,703,102 B1 | 4/2010 | Eppstein et al. |
| 2009/0271472 A1 | 10/2009 | Scheifler et al. |

OTHER PUBLICATIONS

International Search Report issued in counterpart application PCT/CA2011/050360 (Publication W02011156922) by Camran Syed of the Canadian Intellectual Property Office on Sep. 12, 2011, 4 pages.
Written Opinion issued in counterpart application PCT/CA2011/050360 (Publication W02011156922) by Camran Syed of the Canadian Intellectual Property Office on Sep. 12, 2011, 4 pages.
W. Gentzsch. Sun Grid Engine: Towards Creating a Compute Power Grid. In Proc. 1st Symposium on Cluster Computing and the Grid, Brisbane, Australia, May 2001, pp. 35-36.
M. McNett, D. Gupta, A. Vandat, and G. Voelker. Usher: An Extensible Framework for Managing Clusters of Virtual Machines. In Proc. 21st LISA, Dallas, TX, Nov. 2007, pp. 167-181.
M. Steinder, I. Whalley, D. Carrera, I. Gaweda, and D. Chess. Server Virtualization in Autonomic Management of Heterogeneous Workloads. In Proc. 10th Integrated Network Management (IM) conference, Munich, Germany, 2007, 10 pages.
T. Wood, P. Shenoy, A. Venkataramani, and M. Yousif. Black-box and Gray-box Strategies for Virtual Machine Migration. In Proc. 4th Symposium on Networked Systems Design and Implementation (NSDI), Cambridge, MA, Apr. 2007, 14 pages.

(Continued)

*Primary Examiner* — H S Sough
*Assistant Examiner* — Kimberly Jordan
(74) *Attorney, Agent, or Firm* — DiBerardino McGovern IP Group LLC

(57) ABSTRACT

A method and a system for creating a network of virtual machines in a communication network including a head node virtual machine (VM) for distribution and processing of a workload. The head node VM is created and hosted at a server computer. The head node VM specifies the workload that is assignable into sub-tasks. A pool of physical computing devices for hosting a plurality of replica VMs is identified. The head node VM is replicated at each one of the plurality of replica VMs. The plurality of replica VMs coordinate to assign at least one workload sub-task to the each one of the plurality of replica VMs. The at least one assigned workload sub-tasks is processed at the respective each one of the plurality of replica VMs to provide at least one sub-task result. The at least one sub-task result is received at the head node VM.

23 Claims, 5 Drawing Sheets

(56) References Cited

OTHER PUBLICATIONS

Platform EGO Reference, Platform EGO Version 1.2.1, Feb. 2007, 78 pages, by Platform Computing Corporation available at: old.my.platform.com/products/platform-ego.../ego_reference.pdf/.

W. Emeneker and D. Stanzione. Dynamic Virtual Clustering. In Proc. Cluster, Austin, TX, Sep. 2007, 7 pages.

J. S. Chase, D. E. Irwin, L. E. Grit, J. D. Moore, and S. E. Sprenkle. Dynamic Virtual Clusters in a Grid Site Manager. In Proc. 12th Symposium on High Performance Distributed Computing (HPDC), Washington, DC, 2003, 11 pages.

SnowFlock: Rapid Virtual Machine Cloning for Cloud Computing, H. Andres Lagar-Cavilla, Joseph Whitney, Adin Scannell, Philip Patchin, Stephen M. Rumble, Eyal de Lara, Michael Brudno, M. Satyanarayanan, 3rd European Conference on Computer Systems (Eurosys), Nuremberg, Germany, Apr. 2009, 12 pages.

Flexible Computing with Virtual Machines, H. Andres Lagar-Cavilla, thesis submitted for PhD, Graduate Department of Computer Science, University of Toronto, Sep. 2009, 181 pages.

Adding the Easy Button to the Cloud with SnowFlock and MPI, Philip Patchin, H. Andres Lagar-Cavilla, Eyal de Lara, Michael Brudno, 3rd Workshop on System-level Virtualization for High Performance Computing (HPCVirt 2009), Nuremberg, Germany, Apr. 2009, 8 pages.

Impromptu Clusters for Near-Interactive Cloud-Based Services, H. Andres Lagar-Cavilla, Joseph Whitney, Adin Scannell, Stephen M. Rumble, Eyal de Lara, Michael Brudno, M. Satyanarayanan, Department of Computer Science, University of Toronto, Technical Report CSRG-TR578, Jun. 2008, 15 pages.

Snowflock: Virtual Cluster Technology for Bioinformatics Applications, Michael Brudno, H. Andres Lagar-Cavilla, Eyal de Lara, Stephen M. Rumble, Adin Scannell, Joseph Whitney, Poster at the 16th Annual International Conference Intelligent Systems for Molecular Biology (ISMB), Toronto, ON, Jan. 2008, 1 page.

METHOD AND SYSTEM FOR WORKLOAD DISTRIBUTING AND PROCESSING ACROSS A NETWORK OF REPLICATED VIRTUAL MACHINES

FIELD

The present disclosure relates generally to a method and system for workload distribution and processing operations across a network of replicated virtual machines.

BACKGROUND

Cloud computing refers to an implementation of computing technology that transfers the responsibility for a computer workload, such as storing data or processing data, from a dedicated computer to a network of remote computers, the remote computers being accessible, and interconnected, via a communication network, such as the Internet or other wide area network.

The computing activity at the dedicated and remote computers may be implemented using any combination of hardware and software as embodied in computer servers, desktop computers, database servers and other physical computing devices. The remote computers may be operated by a third-party cloud services provider, typically on a pay-for-usage basis; for example, if a business entity was using the cloud for information storage, the cloud services provider would charge for the storage space used.

Cloud computing capacity may advantageously be scaled as necessary to satisfy a business user's workload, and willingness to pay for such usage at the prevailing rate. The cloud services provider may appear to such a business user as a single virtual resource, when it fact it may be composed of many computers hosted at remote and disparate locations. Yet further, those remote- and disparately-located computers may even be owned by different third party providers working in conjunction. Whether a single or several third party providers are providing the cloud service, the workload from a given user (or users) needs to be distributed for processing amongst the cloud computers in a manner that provides workload responsiveness as well as competitive pay-for-usage rates.

SUMMARY OF THE INVENTION

Provided is a method for distribution and processing of a workload in network of virtual machines in a communication network, including a head node virtual machine (VM). The method comprises creating the head node VM hosted at a server computer, the head node VM specifying the workload, the workload being assignable into sub-tasks; identifying a pool of hosts for hosting a plurality of replica VMs, each of the pool of hosts comprising a physical computing device; replicating the head node VM at an each one of the plurality of replica VMs; coordinating amongst the plurality of replica VMs to assign at least one workload sub-task to the each one of the plurality of replica VMs; processing the at least one assigned workload sub-tasks at the respective each one of the plurality of replica VMs to provide at least one sub-task result; and receiving the at least one sub-task result at the head node VM.

In one embodiment, each of the plurality of replica VMs includes a respective workload coordination module.

In a further variation, the step of coordinating may comprise coordinating by, and amongst, the respective workload coordination modules to assign at least one workload sub-task to the each one of the plurality of replica VMs.

In one embodiment, processing of the workload sub-tasks comprises batch processing of the sub-tasks.

In yet another embodiment, processing of the workload sub-tasks comprises parallel processing of the sub-tasks.

The method, in an embodiment, may comprise marking as idle, at the head node VM, the at least one of the plurality of replica VMs from which the sub-task result is received.

Yet further the method comprise destroying, from the plurality of replica VMs, the at least one replica VM marked as idle.

In another embodiment, the method may comprise deleting, from the pool of hosts, the physical computing device hosting the replica VM marked as idle.

In yet another variation, the method may further comprise monitoring, at the head node VM, an electronic heartbeat of at least one of the plurality of replica VMs; if no heartbeat, removing the at least one of the plurality of replica VMs from the plurality of replica VMs; and marking, at the head node VM, the at least one of the plurality of replica VMs as being either idle or unavailable.

In an alternate embodiment, the method comprises destroying, from the plurality of replica VMs, the replica VM marked as either idle or unavailable.

Yet further, the method may comprise deleting, from the pool of hosts, the physical computing device hosting the replica VM marked as either idle or unavailable.

In a further embodiment, the method comprises displaying, at a graphical user interface display screen of the server computer, at least one of an assignment status and a processing status of the workload.

Also provided is a server computer comprising a processor; and a memory, the memory comprising instructions hosted therein, which when executed in the processor provide a head node virtual machine (VM), the head node VM being replicated at a plurality of replica VMs communicatively hosted within a communication network, the head node specifying a workload, the workload assignable into sub-tasks amongst an each one of the plurality of replica VMs, the assigned sub-tasks being processed via workload communication modules at the respective each one of the plurality of replica VMs to provide at least one sub-task result, the at least one sub-task result for communicating to the head node VM.

The server system, in an embodiment, may comprise a graphical user interface display screen for displaying at least one of an assignment status and a processing status of the workload.

Also provided is a virtual machine (VM)-based workload distribution and processing system in a communication network. The system comprises a head node VM hosted at a server computer, the head node VM specifying the workload, the workload being assignable into sub-tasks; a pool of hosts for hosting a plurality of replica VMs, each of the replica VMs comprising replicated ones of the head node VM, each of the pool of hosts comprising a physical computing device; a respective workload coordination module at each one of the plurality of replica VMs for coordinating assignment and processing of at least one workload sub-task amongst the each one of the plurality of replica VMs, the at least one assigned workload sub-tasks for processing at the respective each one of the plurality of replica VMs to provide at least one sub-task result to the head node VM.

In an embodiment, the workload is assignable into a plurality of batch processing sub-tasks.

In another alternate embodiment, the workload is assignable into a plurality of parallel processing sub-tasks.

In one variation, at least one of the plurality of replica VMs from which the sub-task result is received is destroyed from the plurality of replica VMs.

In yet another embodiment, the physical computing device hosting the removed at least one replica VM is deleted from the pool of hosts.

In a further embodiment, the system may further comprise an external storage device coupled to the server computer for storing the at least one sub-task result provided to the head node VM.

BRIEF DESCRIPTION OF THE DRAWINGS

Embodiments will now be described by way of example only, with reference to the following drawings in which.

DETAILED DESCRIPTION

A key component of cloud computing technologies and services is virtualization. Virtualization is a technique wherein a software component, typically known as a virtual machine monitor, multiplexes a physical computer system among several different operating systems, known as virtual machines. The virtual machines each access a virtual address space that is not tied to the underlying physical memory of the computer system. As a result the operating systems may be securely isolated from each other by the virtual machine monitor. Applications running in each virtual machine are similarly isolated, and are generally unaware that they are executing in a virtual machine as opposed to on a single, dedicated computer system.

Figure 1:
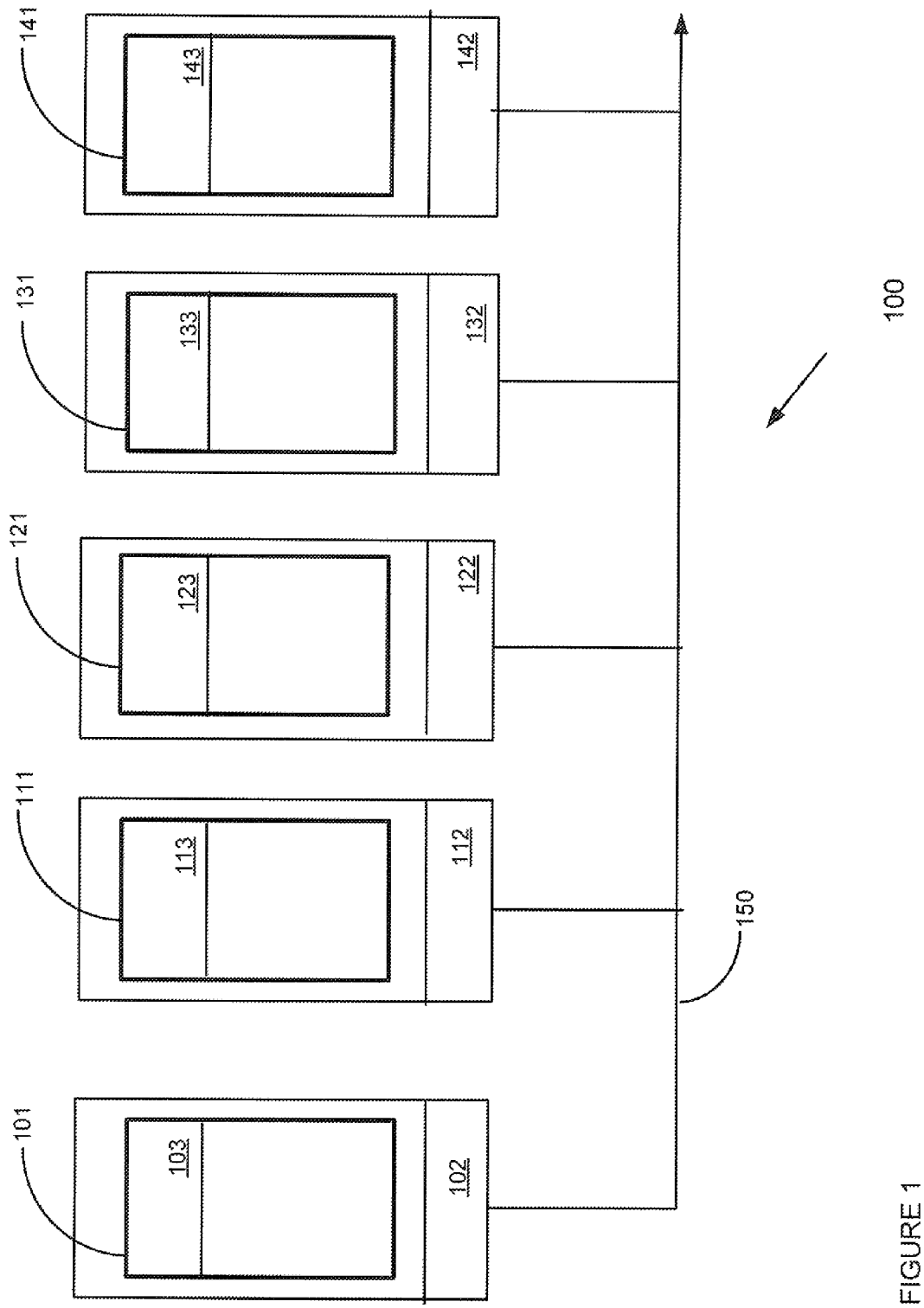
FIG. 1 illustrates an exemplary configuration of a virtual machine (VM) network including a head node VM used to create any number of VM replicas via a replication process, for distribution and processing of a workload.

Referring now more particularly to the accompanying figures, FIG. 1 depicts an exemplary configuration of a virtual machine (VM) network 100 including a head node VM used to create any number of VM replicas via a replication, or "cloning" process, for distribution and processing of a workload. The term virtual machine (VM) used herein is a software container that holds a complete operating environment comparable to that provided by a complete physical computer (host), the operating environment including at least an operating system, system libraries and application stack.

A master virtual machine, or head node 101, is hosted at physical host 102 within communication network 150. The physical host may comprise a server computer 102 or other physical computing device.

Server computer 102 typically includes one or more processors which process instructions stored in memory, which may be flash memory or random access memory. The processors also interact with functional device subsystems such as a graphical user interface screen display, auxiliary input/output (I/O) subsystems, and other communications. The processors, in addition to their operating system functions, may also enable execution of software applications on server computer 102.

Server computer 102 may optionally include a graphical user interface display screen (not depicted in FIG. 1), to enable an operator or administrator to interact therewith, and also to display a processing status of an assigned workload, or workload assignment status with regard to replica or worker VMs. Server computer 102 may also be communicatively coupled to an external database (also not depicted), which may accessed, and read or updated with results from processing at server computer 102. It will be appreciated by one of ordinary skill in the art that server computer 102 may contain additional functions/elements/modules other than those illustrated according to FIG. 1.

VM head node 101, hosted at server computer 102, may include workload coordination module 103. In a network of VMs, the head node VM 102, which may also be referred to as the user head node herein, is the host or VM from which jobs or workloads are typically submitted or launched.

The workload distribution system may consist of two parts. Head node VM 102 contains a virtual machine monitor (VMM) supporting the clone primitive and workload coordination module 103 allowing for the co-ordination of VM creation across other physical hosts 112, 122, 132, 142. These workload coordination modules 103, 113, 123, 133, 143, which may comprise any combination of software, firmware and hardware, may also be supported by software running on non-VM Hosting computers in order to co-ordinate and schedule access to global computing resources.

Each user VM 111, 121, 131, 141 contains a respective workload coordination module 113, 123, 133, 143 that communicates with a corresponding workload coordination module on the physical host in order to request a clone operation when jobs are pending in that VM. This workload coordination module may also co-ordinate workload activity with other workload coordination modules in other replica VMs. The host agents may communicate over one or more physical networks 150, and the VM state may be similarly sent over the one or more physical networks 150 in support of the VM cloning or replication.

The head node VM 102 is cloned, or replicated, in order to handle pending jobs and then the corresponding commands or scripts are run in the replicated VMs. The activity of running the appropriate command or script is co-ordinated by the respective workload coordination module 113, 123, 133, 143 running within a given replica VM 111, 121, 131, 141. No additional program or environment information need be sent over the network 150, since the full operating environment is guaranteed to be an exact clone of the replica VM (acting as a head node in this case). In contrast, on existing workload distribution paradigms, jobs must be individually copied to individual slave nodes from the master or head node.

While FIG. 1 depicts each replica VM 111, 121, 131, 141 as being hosted at physical hosts 112, 122, 132, 142 respectively, those skilled in the art will appreciate that a given physical host may host more than just one replica VM.

Figure 2:
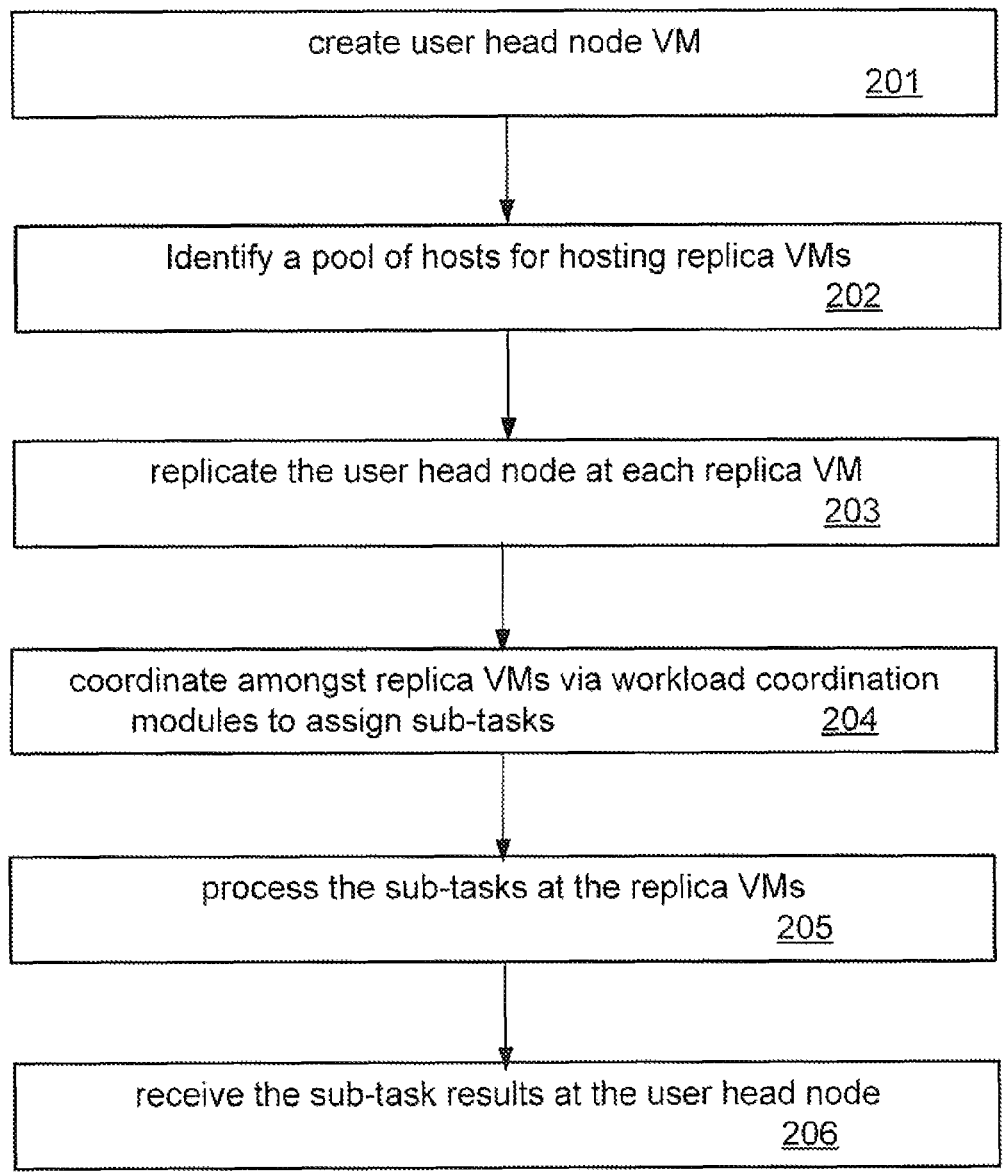
FIG. 2 is a flowchart illustrating progressive workload distribution and processing operations.

FIG. 2 is a flowchart illustrating progressive workload distribution and processing operations according to one embodiment of the method for distribution and processing of a workload in network of virtual machines in a communication network, including a head node virtual machine (VM). The terms worker VM, worker clone VM and replica VM are used interchangeably herein. At step 201, the head node VM 101 is created, hosted at a server computer 102, the head node VM 101 specifying the workload, the workload being assignable into sub-tasks. At step 202, a pool of hosts is identified for hosting a plurality of replica VMs 111, 121, 131, 141, each host of the pool of hosts comprising a physical computing device 112, 122, 132, 142. It is contemplated that any number of worker VMs can be replicated or cloned as necessary, depending on the demands of the workload under assignment. At step 203, head node VM 101 is replicated at each of the plurality of replica VMs. At step 204, respective workload coordination module 113, 123, 133, 143 coordinate amongst the plurality of replica VMs 111, 121, 131, 141 to assign at least one workload sub-task to each of the plurality of replica VMs 111, 121, 131, 141 for processing. At step 205, the assigned workload sub-tasks are processed at the respective replica or worker VMs, to provide at least one sub-task result. At step 206, the sub-task results may be reported to the head node VM 101, or may be reported for storage at an accessible external database or container. Head node VM 101 in turn may store the sub-task and workload processing results at an accessible external database storage.

Figure 3:
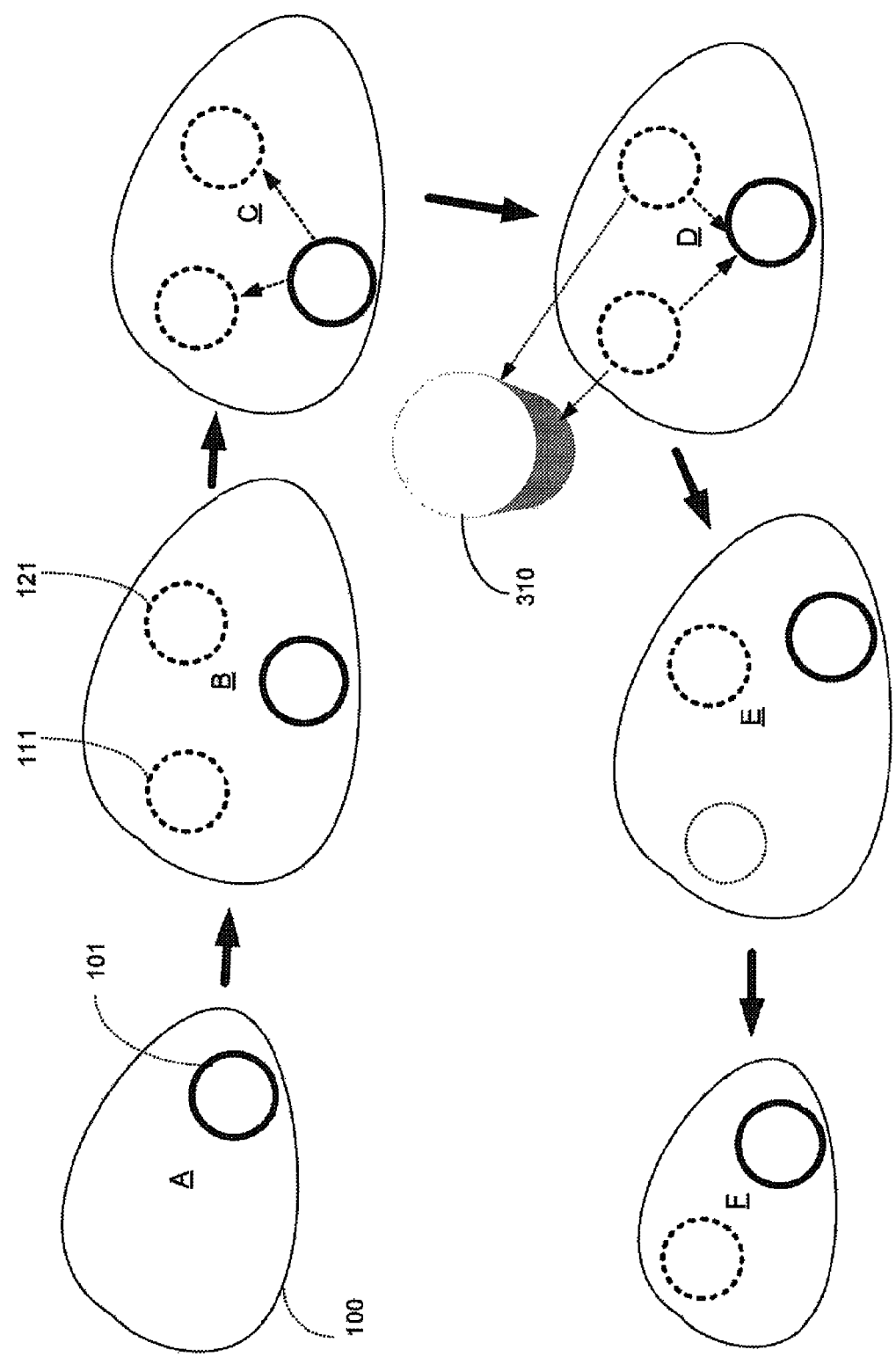
FIG. 3 is a conceptual diagram illustrating progressive workload distribution and processing in batch, or sequential, workload processing.

FIG. 3 is a conceptual diagram illustrating progressive workload distribution and processing in batch, or sequential, workload processing in steps A to F. A batch workload or job, is used herein in the context of a script or command representing a job that can be run independently of other jobs, i.e. it need not run simultaneously with other jobs in order to communicate. From within their operating environment, users submit batch jobs to a queue in a virtual machine (VM) network 100 at step A. At step B, the system clones the users' operating (head node) VM to an appropriate number of worker clone VMs, exemplarily depicted as worker VMs 111, 121. At step C, each worker is given one or more batch processing jobs from the queue, for independent processing. At step D, results from the processing may be reported at user head node 101, and also to external database or container 310.

When the batch worker VMs 111, 121 are finished and are not needed to process jobs, at step E, they may be destroyed and cleared from their physical hosts or may be kept for further jobs as desired. Step F depicts a contracted footprint of virtual machine (VM) network 100 as a result of destroyed worker node 111, for instance. Similarly, any of physical hosts 112, 122, 132, 142 as depicted in FIG. 1 may be deleted or removed from the available pool of hosts, once they no longer host any replica VMs.

Figure 4:
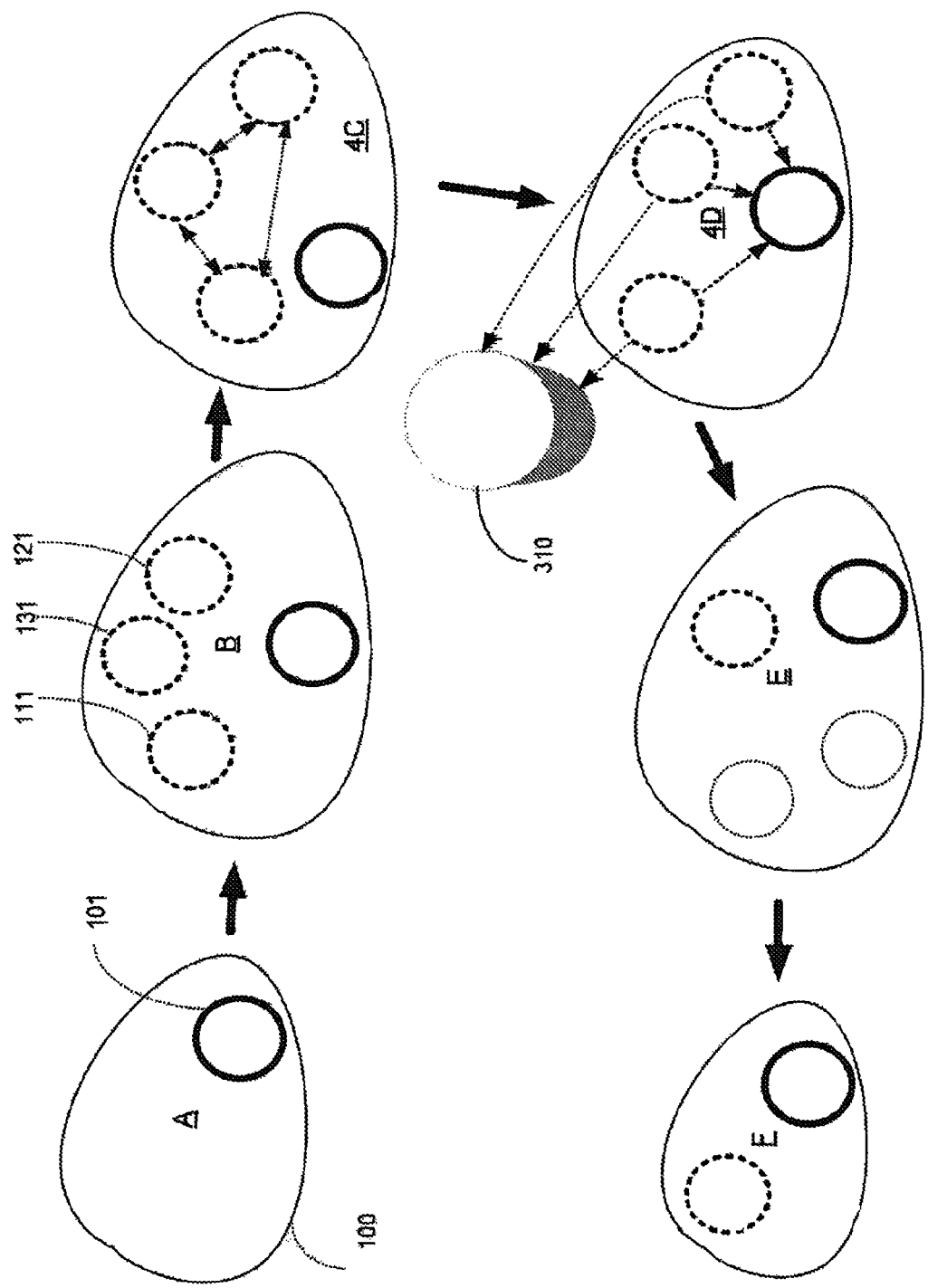
FIG. 4 is a conceptual diagram illustrating progressive workload distribution and processing in parallel workload processing.

FIG. 4 is a conceptual diagram illustrating progressive workload distribution and processing a further embodiment involving parallel workload processing. A parallel processing workload or job, is used to mean a script or specification of a job that mandates many sub-jobs run simultaneously on different hosts and in communication and conjunction with each other. From within their operating environment, users submit parallel processing jobs to a queue at step A. The system checks if an appropriate pool of hosts if available, or creates a sufficient collection of worker or replica VMs 111, 131, 121 at step B. The parallel job is then executed on the selected or created pool of replica VMs 111, 131, 121 at step 4C, based on workload processing coordination via the respective workload coordination modules 113, 133, 123. Results from the parallel job may be placed in user head node 101, at step 4D, or an external data-store, 310 or "container" that all VMs have access to. These containers are exposed automatically to all VMs.

Again, when the parallel processing worker VMs 111, 121, 131, 141 are finished and are not needed to process jobs, they may be destroyed, at step E, and cleared from the hosts 112, 122, 132, 142, or may be kept for further jobs as desired. Also, any of physical hosts 112, 122, 132, 142 depicted in FIG. 1 may be deleted or removed from the available pool of hosts, once they no longer host any replica VMs.

Figure 5:
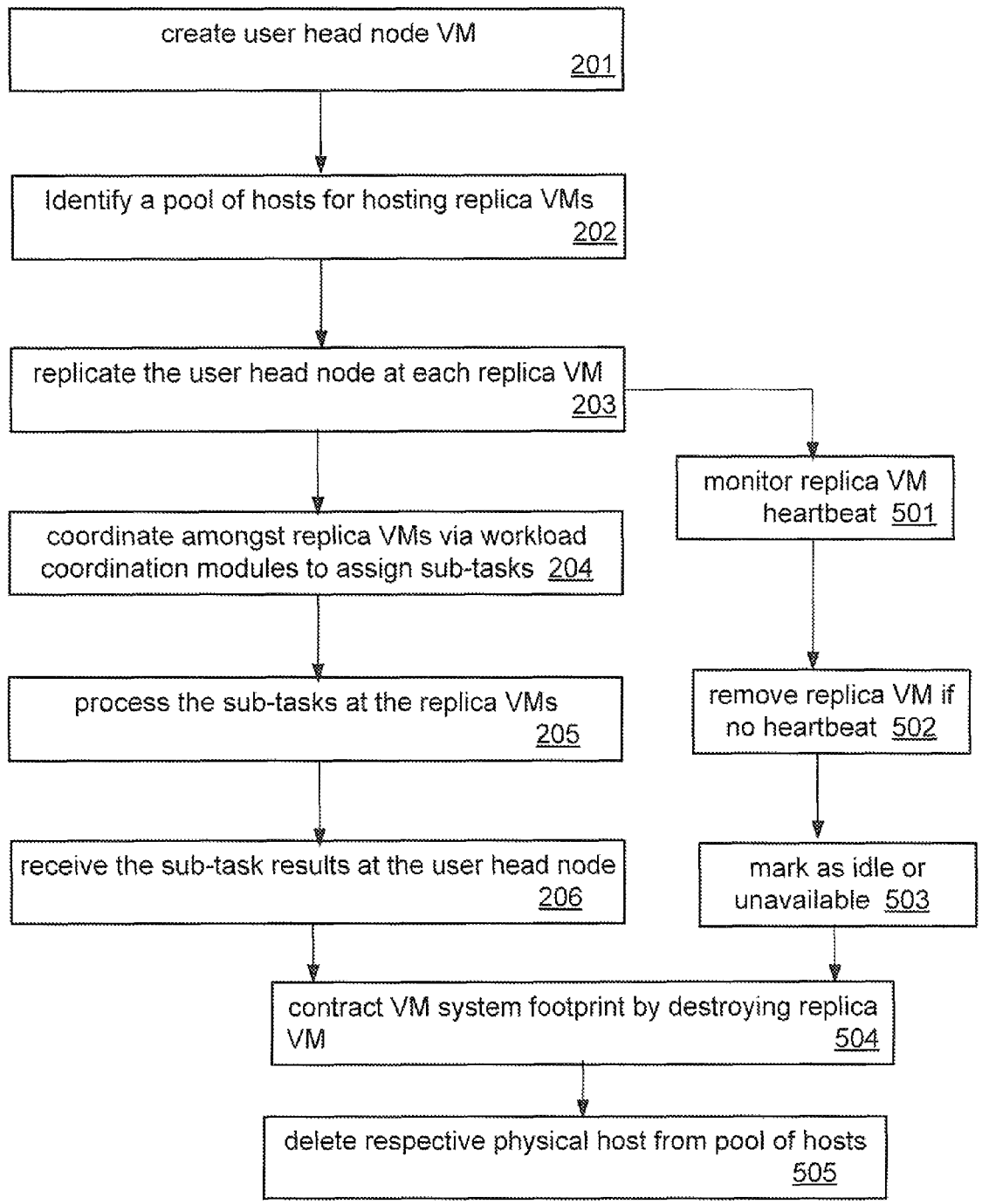
FIG. 5 is a flowchart illustrating progressive workload distribution and processing with incorporation of termination operations.

FIG. 5 is a flowchart illustrating progressive workload distribution and processing with incorporation of termination operations. In this exemplary embodiment, at step 501, head node VM 101 monitors an electronic heartbeat of the replica VMs created. Even if any of the replica VMs have not completed and reported their respective assigned sub-tasks, should the electronic heartbeat be lost or otherwise fails to establish continuity, at step 502, head node VM 101 may remove that replica VM from the plurality of replica VMs created, and proceed, at step 503, to mark that replica VM as either idle or unavailable. Further at step 504 would be for head node VM 101 to destroy that replica VM marked as idle or unavailable, and even yet further, at step 505, to delete its respective physical host from the pool of available physical hosts.

Although a server computer has been used to establish a context for disclosure herein, it is contemplated as having wider applicability within the cloud computing environment. Furthermore, the disclosure herein has been described with reference to specific exemplary embodiments; however, varying modifications thereof will be apparent to those skilled in the art without departing from the scope of the invention as defined by the appended claims.

What is claimed is:

1. A method for distribution and processing of a workload in network of virtual machines in a communication network, including a head node system level virtual machine (VM) server computer, the method comprising:
    creating the head node VM hosted at the server computer, the head node VM specifying the workload, the workload being assignable into sub-tasks;
    identifying a pool of hosts for hosting a plurality of replica VMs, each of the pool of hosts comprising a physical computing device;
    replicating a clone of the head node VM specifying the workload at each one of the plurality of replica VMs;
    coordinating amongst the plurality of replica VMs to assign at least one workload sub-task of the workload to the each one of the plurality of replica VMs; and
    processing the at least one assigned workload sub-tasks of the workload at the respective each one of the plurality of replica VMs without any additional program and environment information being shared over the network about the workload sub-task other than the replicating of a clone of the head node VM at each one of the plurality of replica VMs to provide at least one sub-task result;
    wherein the head node VM and each one of the plurality of replica VMs in the network of VMs is a software container that holds a complete operating environment comparable to that provided by a complete physical computer, the operating environment including at least an operating system, system libraries, and application stack.

2. The method of claim 1 wherein each one of the plurality of replica VMs includes a respective workload coordination module.

3. The method of claim 2, wherein coordinating amongst the plurality of replica VMs comprises coordinating by, and amongst, the respective workload coordination modules to assign at least one workload sub-task to the each one of the plurality of replica VMs.

4. The method of claim 1 wherein processing of the workload sub-tasks comprises batch processing of the sub-tasks.

5. The method of claim 1 wherein processing of the workload sub-tasks comprises parallel processing of the sub-tasks.

6. The method of claim 1 further comprising marking as idle, at the head node VM, the at least one of the plurality of replica VMs from which a sub-task result is received.

7. The method of claim 6 further comprising destroying, from the plurality of replica VMs, the at least one replica VM marked as idle.

8. The method of claim 7 further comprising deleting, from the pool of hosts, the physical computing device hosting the replica VM marked as idle.

9. The method of claim 1 further comprising:
monitoring, at the head node VM, an electronic heartbeat of at least one of the plurality of replica VMs;
if no heartbeat, removing the at least one of the plurality of replica VMs from the plurality of replica VMs; and
marking, at the head node VM, the at least one of the plurality of replica VMs as being either idle or unavailable.

10. The method of claim 9 further comprising destroying, from the plurality of replica VMs, the replica VM marked as either idle or unavailable.

11. The method of claim 10 further comprising deleting, from the pool of hosts, the physical computing device hosting the replica VM marked as either idle or unavailable.

12. The method of claim 1 further comprising:
displaying, at a graphical user interface display screen of the server computer, at least one of an assignment status and a processing status of the workload.

13. The method of claim 1 wherein the head node VM includes a workload coordination module.

14. A server computer configured to implement a head node VM that is replicated at a plurality of replica VMs communicatively hosted within a communication network, the server computer comprising:
a processor; and
a memory, the memory comprising instructions hosted therein, which when executed in the processor implement the head node virtual machine (VM), the head node configured to:
specify a workload, the workload assignable into sub-tasks amongst each one of the plurality of replica VMs, the assignment of the sub-tasks being coordinated amongst the plurality of replica VMs via workload communication modules at the respective plurality of replica VMs to assign at least one workload sub-task of the workload to the each one of the plurality of replica VMs, the assigned workload sub-tasks being processed at the respective each one of the plurality of replica VMs without an additional program and environment information being shared over the network about the workload sub-task other than the replicating of a clone of the head node VM specifying the workload at each one of the plurality of replica VMs to provide at least one sub-task result from each of the respective replica VMs, and
receive the at least one sub-task result from each of the replica VMs;
wherein the head node VM and each one of the plurality of replica VMs is a software container that holds a complete operating environment comparable to that provided by a complete physical computer, the operating environment including at least an operating system, system libraries, and application stack.

15. The server computer of claim 14, wherein the memory further comprises instructions, which when executed in the processor implement a graphical user interface display screen for displaying at least one of an assignment status and a processing status of the workload.

16. The server computer of claim 14 wherein the head node VM includes a workload coordination module.

17. A virtual machine (VM)-based workload distribution and processing system in a communication network, the system comprising:
a head node VM hosted at a server computer, the head node VM specifying the workload, the workload being assignable into sub-tasks; and
a pool of hosts, each of the pool of hosts comprising a physical computing device configured to host a replica VM, each of the replica VMs configured to replicate a clone of the head node VM specifying the workload, each of the replica VMs comprising:
a respective workload coordination module configured to coordinate assignment and processing of at least one workload sub-task amongst each one of the plurality of replica VMs, the at least one assigned workload sub-tasks configured to be processed at the respective each one of the plurality of replica VMs without an additional program and environment information being shared over the network about the workload sub-task other than the replicating of a clone of the head node VM at each one of the plurality of replica VMs and to provide at least one sub-task result to the head node VM;
wherein the head node VM and each of the replica VMs is a software container that holds a complete operating environment comparable to that provided by a complete physical computer, the operating environment including at least an operating system, system libraries, and application stack.

18. The system of claim 17 wherein the workload is assignable into a plurality of batch processing sub-tasks.

19. The system of claim 17 wherein the workload is assignable into a plurality of parallel processing sub-tasks.

20. The system of claim 17 wherein at least one of the plurality of replica VMs from which a sub-task result is received is destroyed from the plurality of replica VMs.

21. The system of claim 20 wherein the physical computing device hosting the removed at least one replica VM is deleted from the pool of hosts.

22. The system of claim 17 further comprising an external storage device coupled to the server computer for storing at least one sub-task result provided to the head node VM.

23. The system of claim 17 wherein the head node VM includes a workload coordination module.

* * * * *